US006376593B1

(12) United States Patent
Sasaka et al.

(10) Patent No.: US 6,376,593 B1
(45) Date of Patent: Apr. 23, 2002

(54) RUBBER COMPOSITION AND PNEUMATIC TIRE FORMED USING THE RUBBER COMPOSITION

(75) Inventors: Naohiro Sasaka; Yoichiro Kondo, both of Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/615,697

(22) Filed: Jul. 13, 2000

(30) Foreign Application Priority Data

Jul. 13, 1999 (JP) .......................................... 11-198646
Jun. 5, 2000 (JP) .......................................... 12-167306

(51) Int. Cl.$^7$ ................................................. C08K 3/34
(52) U.S. Cl. ....................................... 524/492; 524/424
(58) Field of Search .................................. 524/424, 492

(56) References Cited

U.S. PATENT DOCUMENTS

| 4,360,049 A | 11/1982 | Imai ........................ 152/209 R |
| 5,959,039 A | 9/1999 | Yokoyama et al. ......... 525/236 |

FOREIGN PATENT DOCUMENTS

| EP | 0 623 650 A | 11/1994 |
| JP | 07-233285 | 9/1995 |
| JP | 10-053671 | 2/1998 |
| JP | 11-060812 | 3/1999 |
| JP | 11-124470 | 5/1999 |

*Primary Examiner*—Kriellion A. Sanders
(74) *Attorney, Agent, or Firm*—Sughrue Mion, PLLC

(57) ABSTRACT

A rubber composition and a pneumatic tire formed by using the rubber composition is provided which has excellent snow and ice control and braking performance on snowy and/or icy road surface and provides a satisfactory wet skid performance. The present invention is a rubber composition and pneumatic tire formed using the rubber composition in at least the tread portion thereof, the rubber composition comprising a 100 parts by weight of rubber component comprising (1) 5 percent by weight to 50 percent by weight of low molecular weight butadiene rubber (BR) having a cis 1,4-structure of 60 mol % to 98 mol % and a weight average molecular weight (Mw) of 5000 to 80000; and (2) 50 percent by weight to 90 percent by weight of styrene-butadiene rubber (SBR) having a bound styrene content of 15 percent by weight to 45 percent by weight and amount of a vinyl bonding in the butadiene portion of 7 mol % to 60 mol %; and 40 parts by weight to 95 parts by weight of silica.

13 Claims, 1 Drawing Sheet

RUBBER COMPOSITION AND PNEUMATIC TIRE FORMED USING THE RUBBER COMPOSITION

BACKGROUND OF THE INVENTION

1. Field of the Invention

The present invention relates to a rubber composition and to a pneumatic tire formed using the rubber composition and, specifically, to a rubber composition that is excellent for use in a tire tread and that prevents deterioration in wet skid performance, and to a pneumatic tire formed by using this rubber composition that has excellent braking and control performance on icy and snowy road surface.

2. Description of the Related Art

Tires that run on normal road surfaces are formed using a rubber composition that mainly comprises a styrene-butadiene copolymer that shows a comparatively high glass transition temperature as the composition for the tire tread. This is because importance is given to the braking performance, as well as the ability to control the tire, of the tire on a wet road surface (wet skid performance). In contrast, tires for use in a winter are formed using mainly polybutadiene rubber or natural rubber that shows a low glass transition temperature because importance is given to the braking performance of the tire on ice or snow (ice skid performance).

Ice skid performance places importance on increasing the coefficient of friction with the road surface by increasing the level of flexibility in the tread rubber in low temperatures (e.g. approximately −20° C.). In low temperatures, the modulus of elasticity of the rubber composition is raised inhibiting the tire from following the bumps and indentations in the road surface, and on the other hand, an icy road surface has fewer bumps and indentations than a normal road surface. As a result, the contribution of the energy dissipation (tanδ) generated between the rubber and the road surface to the ice skid performance is reduced. In low temperature conditions, it is necessary to increase the size of the real contact surface area between the rubber and the road surface, so that is more vital to lower the storage modulus of elasticity E' (elastic modulus reduction) in the area of −20° C. If the modulus of elasticity is lowered in low temperatures when a normal BR is used, however there is a remarkable deterioration in the wet skid performance. Therefore, attempts have been made to suppress this deterioration in the wet skid performance by using silica ($SiO_2$) as a filler in a tread rubber composition. Although the wet skid performance can be improved by using silica as a filler in this way, the performance is still not satisfactory compared with a tire designed for use in normal conditions (i.e. non winter conditions).

Moreover, if $SiO_2$ is blended in large quantities, the electric resistance of the tread rubber increases, therefore, static electricity is easily generated from the tire surface throughout the vehicle, leading to radio noise being generated, as well as giving rise to a fear of danger from sparks being giving off while the car is being filled with gasoline, and the like.

SUMMARY OF THE INVENTION

The present invention was conceived in view of the above problems. It is an object of the present invention to provide a rubber composition and a pneumatic tire formed using that rubber composition as its tread rubber, the rubber composition that has excellent driving control and braking performance on icy or snowy road surfaces, namely, ice skid performance, and is able to provide satisfactory wet skid performance by preventing any reduction in wet skid performance.

As a result of intense studies, the present inventors have noticed that the above problems can be solved by using a low molecular weight cis form butadiene rubber, and thus achieved the present invention.

Namely, the rubber composition of the present invention comprises a 100 parts by weight of rubber component comprising. (1) 5 percent by weight to 50 percent by weight of low molecular weight butadiene rubber (BR) having a cis 1,4-structure of 60 mol % to 98 mol % and a weight average molecular weight (Mw) of 5000 to 80000; and (2) 50 percent by weight to 90 percent by weight of styrene-butadiene rubber (SBR) having a bound styrene content of 15 percent by weight to 45 percent by weight and amount of a vinyl bonding in the butadiene portion of 7 mol % to 60 mol %; and 40 parts by weight to 95 parts by weight of silica. In addition, the pneumatic tire of the present invention is provided at least with a tread portion, and the rubber composition that forms at least the portion of the tread portion that makes contact with the road surface is formed using the above rubber composition.

DESCRIPTION OF THE PREFERRED EMBODIMENTS

Figure 1:
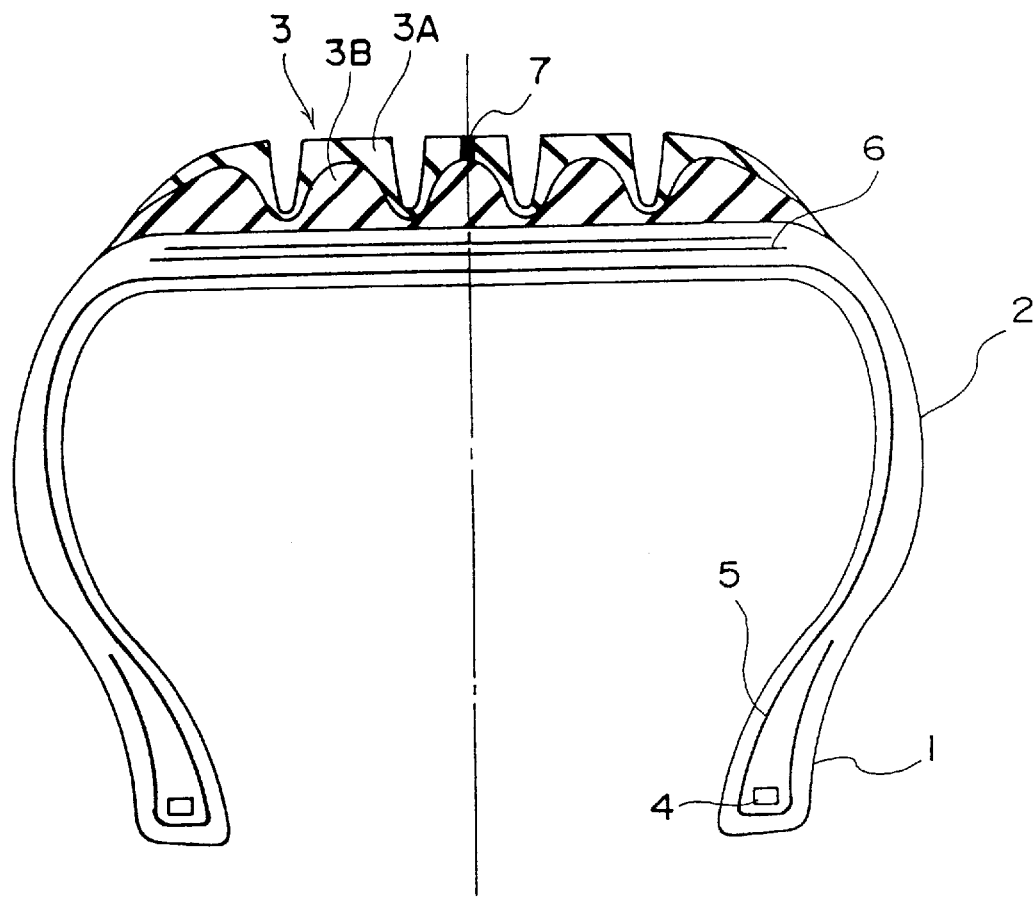
FIG. 1 is a cross-sectional view through a plane which includes the central axis of rotation, showing an aspect of the pneumatic tire of the present invention.

The present invention is described below in detail.

A pneumatic tire (referred to below simply as a tire in FIG. 1) comprises a pair of bead portions 1, a pair of sidewall portions 2, and a tread portion 3. Each of these portions 1 to 3 is reinforced by a carcass 5 which extends between two bead cores 4 buried in the bead portions 1. A belt place on the outside of the crown portion of the carcass 5 further strengthens the tread portion 3. The tread portion 3 is formed from two tread rubber layers, namely, a cap layer 3A and a base layer 3B.

Note that although the tread portion 3 is a two-layer structure in FIG. 1, the structure of the tread portion 3 in the pneumatic tire of the present invention is not particularly limited, and may be a single-layer structure or a multi-layer structure.

Figure 2:
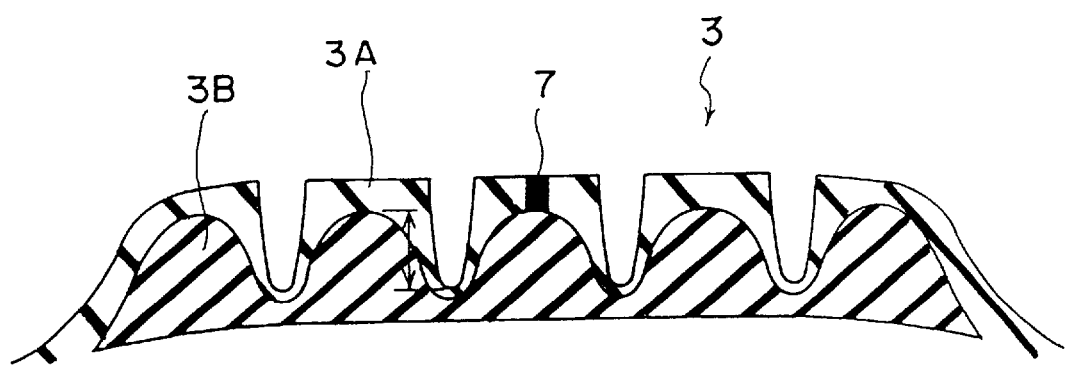
FIG. 2 is an enlarged cross-sectional view of the area of the tread portion of the pneumatic tire shown in FIG. 1.

FIG. 2 is an enlarged cross-sectional view of the tread portion 3 of the pneumatic tire shown in FIG. 1. As can be seen in FIG. 2, in a preferable aspect of the present invention, an electrically conductive insert 7 is formed in the center of the tread portion 3 radially extending through the cap layer 3A and reaching the base layer 3B. Note that, in the specific example shown, there is one electrically conductive insert, however, two or more of them may be provided in any place of the tread portion.

In the present invention, at least a road contacting portion of the tread portion 3 of this tire that comes into contact with the road surface is characterized by the fact that it is formed by using the rubber composition of the present invention (where appropriate, this portion of the tire that contacts the road surface is referred to below simply as "road contacting surface", and an example thereof is the cap layer 3A shown in FIG. 2).

Here, the term "road contacting surface" refers to the surface area of a tire in contact with the road when the tire is fitted onto an appropriate rim, is filled to a standard air pressure, is placed in a stationary state so as to be vertical relative to a flat plane, and a standard load is applied thereto. The standards for these are in the JATMA standards, as described in the JATMA Yearbook, 1996, which describes the tire fitted onto a standard rim, and the maximum load capability for the tire size and ply rating, as well as the corresponding air pressure (maximum air pressure).

The rubber composition of the present invention contains a rubber component and silica, as well as other components which are appropriately selected as needed.

The rubber component includes low molecular weight butadiene rubber (BR) and styrene-butadiene rubber (SBR), as well as other rubber components as needed.

In the present invention, the low molecular weight liquid BR (1) used in the rubber composition of the tread portion has a lower molecular weight than conventional general purpose BR. Therefore, loss of fluid energy occurs easily and the hysteresis loss as a polymer is high. For this reason, the BR is considered to make a contribution to good wet performance.

The low molecular polybutadiene which is component (1) of the rubber composition has a content of cis-1,4-structure 60 to 98 mol %, and preferably of 85 to 98 mol %. If the cis-1,4-structure content is less than 60 mol %, there is insufficient improvement in the ice skid performance, and anti-abrasion performance cannot be maintained. If, however, the content of cis-1,4-structure exceeds 98 mol %, the production thereof is difficult from a synthetic technology viewpoint, and the costs are high. Therefore neither is preferable. The content of the cis structure is obtained, in this case, by calculation according to the MORERO method using an infrared spectrophotometer.

The weight average molecular weight (Mw) of the BR of the component (1) is 5000 to 80000. In the present invention, a value measured by gel permeation chromatography (GPC) is used for this weight average molecular weight (Mw).

If the weight average molecular weight (Mw) of the BR, i.e. the component (1), exceeds 80000, there is insufficient improvement in the wet skid performance and in the ice skid performance. Polybutadiene rubber whose Mw is less than 5000 has excessive reduction in the abrasion resistance thereof and excessive increase in heat generation and in hysteresis loss. In addition, the industrial production thereof is difficult and, therefore, such polybutadiene rubber is not preferable.

The low molecular weight polybutadiene having a high content of cis-1,4-structure which is the component (1) suitable for the present invention can be polymerized by using, for example, a catalyst comprising a nickel compound such as Ni.naph—an organic aluminum compound such as $AlEt_2Cl$—$H_2O$, or the like. An example of the production thereof is given below. Eight hundred milliliters of benzene and 124 g of 1,3-butadiene were placed and stirred in a nitrogen purged, stirrer attached, 1.5 liter autoclave. Into the autoclave 1.66 millimols of water were added and dissolved therein. Then 4.15 millimols of diethyl aluminum monochloride were then added and the mixture was heated to 80° C. Then 0.02 millimols of nickel octene acid were added and the mixture was allowed to polymerize at 80° C. for 30 minutes. 5 milliliters of methanol which contains a small amount of 2,6-ditertiarybutylparacresol were added to the polymerized solution to stop the polymerization. After the pressure was discharged, the polymerized solution was vacuum dried to obtain polybutadiene. The microstructure of the obtained polymer was found by infrared absorption spectrum to have a content of the cis bond obtained from an absorption strength ratio of cis 740 $cm^{-1}$, trans 987 $cm^{-1}$, and vinyl 910 $cm^{-1}$ of 91.0 percent by weight. The intrinsic viscosity [η] measured in a toluene solution at 30° C. was 0.3. The Mw (weight average molecular weight) and Mw/Mn (number average molecular weight) were obtained in terms of polystyrene measured using a gel permeation chromatograph (GPC) and the Mw was found to be 20000, while the Mw/Mn was found to be 2.2.

The amount of this low molecular weight BR (1) is in the rubber component is 5 to 50 percent by weight. If the amount of low molecular weight BR in the rubber component is less then 5 percent by weight, the improvement in neither the wet skid performance nor ice skid performance is sufficient. If the amount exceeds 50 percent by weight, heat generation increases and rolling friction resistance is also increased. Neither of these is therefore preferable.

The rubber component contains 50 to 90 percent by weight of styrene-butadiene rubber (SBR) (2) having 15 to 45 percent by weight of bound styrene and amount of a vinyl bonding in the butadiene portion of 7 mol % to 60 mol %.

In the styrene-butadiene rubber, if the amount of bound styrene is less than 15 percent by weight, the wet skid performance deteriorate. If the amount of bound styrene exceeds 45 percent by weight, the ice skid performance deteriorate.

The amount of the bound styrene can be calculated from the H-NMR integration ratio.

If the vinyl bonding amount is less than 7 mol %, the durability, in particular, the resistance to blow up deteriorate. If the vinyl bonding amount exceeds 60 mol %, heat generation increases and friction resistance increases.

The amount of vinyl bonding refers to the ratio (mol %) of the vinyl bonding obtained through 1,2-type addition to the total the butadiene monomer units in the styrene-butadiene rubber. The amount of vinyl bonding can be measured by using an infrared method (MORERO method).

The content of the SBR in the rubber component needs to be 50 to 90 percent by weight, and is preferably 60 to 80 percent by weight. If the content is less than 50 percent by weight, the wet skid performance is insufficient, while if the content exceeds 90 percent by weight, performance on snowy or icy road surface is reduced, neither of which is preferable.

Other rubber components are not particularly restricted, and components normally used in a rubber composition for a tire may be suitably used. A preferable example of such a component is diene based rubber, specifically, other BR, other SBR, natural rubber (NR), synthetic isoprene rubber (IR), and the like. In particular, it is preferable if natural rubber is blended in an amount of 30 percent by weight or less.

Silica is blended in the rubber composition of the present invention in an amount of 40 parts by weight to 95 parts by weight relative to 100 parts by weight of the rubber component. If the amount of silica blended is less than 40 parts by weight, the improvement in the wet skid performance is insufficient which is not preferable, while if the amount of silica blended exceeds 95 parts by weight, the strength and abrasion resistance are insufficient, and a remarkable amount of static electricity is generated, which is also not preferable.

Carbon black can also be blended into the rubber composition of the present invention. In this case, the total amount of the carbon black and the silica is preferably from 70 parts by weight to 99 parts by weight relative to 100 parts by weight of the rubber component. If the total blended amount of the carbon black and silica is less than 70 parts by weight, the dry performance may deteriorate, while if the total blended amount of the carbon black and silica exceeds 99 parts by weight, the abrasion resistance may deteriorate.

The amount of the silica is preferably from 45 percent by weight to 99 percent by weight of the total amount of the carbon black and silica. If the blended amount of the silica is less than 45% by weight, the wet skid performance may deteriorate.

It is also preferable that a silane coupling agent be blended into the rubber composition of the present invention. The advantage of using a silane coupling agent is that the bond between the silica and the rubber component is strengthened, while the abrasion resistance is secured.

Examples of the silane coupling agent include bis(3-triethoxysilylpropyl)polysulfide, bis(2-triethoxysilylethyl)polysulfide, bis(3-trimethoxysilylpropyl)polysulfide, bis(2-trimethoxysilylethyl)polysulfide,
3-mercaptopropyltrimethoxylsilane,
3-mercaptopropyltriethoxysilane,
2-mercaptoethyltrimethoxysilane,
2-mercaptoethyltriethoxysilane,
3-nitropropyltrimethoxysilane,
3-nitropropyltriethoxysilane,
3-chloropropyltrimethoxysilane,
3-chloropropyltriethoxysilane,
2-chloroethyltrimethoxysilane,
2-chloroethyltriethoxysilane, 3-trimethoxysilylpropyl-N,N-dimethylthiocarbamoyl polysulfide, 3-triethoxysilylpropyl-N,N-dimethylthiocarbamoyl polysulfide, 2-triethoxysilylethyl-N,N-dimethylthiocarbamoyl polysulfide, 3-trimethoxysilylpropylbenzothiazole polysulfide, 3-triethoxysilylpropylbenzothiazole polysulfide, 3-triethoxysilylpropylmethacrylate monosulfide, 3-trimethoxysilylpropylmethacrylate monosulfide, and the like. Of these, bis(3-triethoxysilylpropyl)polysulfide and 3-trimethoxysilylpropylbenzothiazole polysulfide are preferably used.

Further examples include bis(3-diethoxymethylsilylpropyl)polysulfide,
3-mercaptopropyldimethoxymethylsilane,
3-nitropropyldimethoxymethylsilane,
3-chloropropyldimethoxymethylsilane,
dimethoxymethylsilylpropyl-N,N-dimethylthiocarbamoyl polysulfide, dimethoxymethylsilylpropylbenzothiazole polysulfide, and the like.

The amount included of the silane coupling agent is preferably 5 to 20 percentage by weight relative to the amount of silica, and more preferably 10 to 15 percentage by weight relative to the amount of silica.

In addition to the above silica and carbon black, other fillers can be used in various combinations depending on the aim, provided that the effects of the present invention are not lost. Examples of other fillers include: reinforcing agents such as active calcium carbonate, ultrafine particles of magnesium silicate, high-styrene resin, phenol resin, lignin, modified melamine resin, coumarone-indene resin, and petroleum resins; calcium carbonate; basic magnesium carbonate; clay, litharge, diatomaceous earth, recycled rubber, and rubber powder.

If necessary, chemicals normally used in the rubber industry such as a vulcanizing agent, a vulcanization accelerator, an anti-oxidant, process oil, zinc white, stearic acid, and the like may be added to the rubber composition of the present invention.

Known vulcanizing agents, for example, sulfur, organic peroxide, resin vulcanizing agents, metallic oxides such as magnesium oxide and the like may be used as the vulcanizing agent.

Known vulcanization accelerators, for example, aldehydes, ammonias, amines, guanidines, thioureas, thiazoles, sulfenamides, thiurams, dithiocarbamates, xanthates, and the like may be used as the vulcanization accelerator.

Amine—ketone based compounds, imidazole based compounds, amine based compounds, phenol based compounds, sulfur based compounds, and phosphorous based compounds may be used as the antioxidant.

Any of aromatic based process oil, naphthene based process oil, and paraffin based process oil may be used.

When blending the rubber composition of the present invention, the components may be kneaded by using a closed-type mixer or an open-type mixer to produce the rubber composition. As the closed type mixer, an internal mixer such as Banbury®, Intermix®, kneader can be exemplified, and as the open-type mixer, a roll mixer can be exemplified. It is also possible to mix them in advance while they are still in their solution state after polymerization, and then dry the mixture and use this.

It is preferable if the ratio $\{E'(-20)/E'(30)\}$ of the dynamic modulus of elasticity of the rubber composition thus obtained at $-20°$ C. $\{E'(-20)\}$ to the dynamic modulus of elasticity of the rubber composition thus obtained at $30°$ C. $\{E'(-30)\}$ is less than 5.5 and, more preferably, is in the range of from 2.5 to 5.3. A rubber composition which fulfills these conditions provides both excellent ice skid performance in low temperatures and excellent wet skid performance in wet conditions. If the ratio exceeds 5.5 then the ice skid performance is unsatisfactory, which is not acceptable. If this ratio is 2.5 or more, the wet skid properties can be improved even further. This dynamic viscoelasticity can be measured using the method of JIS K6394-1995.

The rubber composition of the present invention has excellent wet skid performance and ice skid performance. Therefore, the pneumatic tire of the present invention which uses this rubber composition in at least the road contacting portion of the tread portion thereof may be satisfactorily used as a tire such as a studless tire, a snow tire, and an all season tire, or may be a heavy vehicle tire.

A further aspect of the pneumatic tire of the present invention can be mentioned in which the tread portion comprises a two layer structure formed from a cap layer and a base layer, and at least one electrically conductive insert radially extending through the cap layer to reach the base layer. This aspect is preferable as it reduces the effects caused by the tendency of silica towards electrification. Namely, because an electrically conductive insert is formed within the road contacting surface, a path for the electricity to escape through is created. As a result, static electricity generated in the car be rapidly discharged though tire surface, allowing harmful effects caused by the static electricity to be reduced.

In view of the effectiveness thereof, it is preferable if the volume specific resistance of the electrically conductive insert is $10^9$ Ωcm or less.

The electrically conductive insert is formed by providing an electrically conductive rubber member comprising an electrically conductive rubber composition in a portion of the rubber of the tread portion. The electrically conductive rubber composition preferably has a specific resistance of $10^9$ Ωcm or less. A small specific resistance is preferable, and a specific resistance of $10^6$ Ωcm or less is more preferable in order to obtain a marked effect on preventing static electricity.

The electrically conductive insert member 7 is formed from an electrically conductive rubber composition. The configuration, the structure and the like thereof are not particularly limited, and can be selected appropriately in accordance with the purpose. However, here, the electrically conductive insert member 7 is a plate-shaped member. The electrically conductive insert member 7 is embedded in the tread portion 3.

It is preferable if a diene-based rubber and carbon black having a nitrogen absorption specific surface area ($N_2SA$) of 80 $m^2/g$ or more and more preferably 130 $m^2/g$ or more, and a dibutyl phthalate (DBP) oil absorption amount of 100 ml/100 g and more preferably of 110 cm3/100 g or more are blended in the conductive rubber composition. By using this carbon black which has a fine particle and a high structure in the electrically conductive rubber composition, the durability of the rubber layer forming the current-carrying path is improved, and the effect of preventing the static electricity can be manifested until the final stages of the running life of the tire. The values for the $N_2SA$ mentioned here were obtained by referring to ASTM D3037-89 and the values for the DBP were obtained by referring to ASTM D2414-97.

When the proportion of the carbon black blended into 100 parts by weight of the diene-based rubber is from 40 parts by weigh to 100 parts by weight, sufficient reinforcing properties are secured. By keeping the proportion within this range, when the amount of softening agent used is small, a suitable hardness after vulcanization is obtained and cracks are prevented, while when the amount of softening agent used is large deterioration in the abrasion resistance is prevented.

Note that, with regard to the electrically conductive insert, the inventors of the present invention made use of the description given in detail previously in EP-A 895877, the description of which is incorporated by reference herein.

The present invention is described in detail below using examples, however, the present invention is not limited to these examples.

EXAMPLES

Examples 1 to 4 and Comparative examples 1 and 2

A rubber composition for tread rubber was blended in the proportions shown in Table 1 below. The compounding recipe of a conventional rubber composition is also shown for reference (subject example).

Note that the detailed nature of the blended components of each type of rubber composition used in table 1 are as shown below.

SBR 1500 (trade name manufactured by JSR Inc., bound styrene content 23.5 percent by weight, vinyl bond amount 18.9 mol %)

BR01 (trade name manufactured by JSR Inc.)

Low molecular weight BR (content of cis 1,4 structure 91 mol %, Mw=17000)

Carbon black (SAF)

Silica (nipseal VN3: trade name manufactured by Nippon Silica Kogyo Co., Ltd.)

Si69: trade name manufacture by Degussa AG

Aromatic oil

The above molecular weight (Mw) and content of cis-1,4 structure of the low molecular weight butadiene rubber (BR) were measured as shown below.

(1) Measurement of the molecular weight (Mw) Approximately 100 mg of BR was weighed and left overnight in 20 ml of THF. Measurement was performed under the conditions given below using a GPC (HLC-8020 manufactured by Tosoh).

| | |
|---|---|
| column | 2 × $GMH_{XL}$ + HXL − H |
| flow rate | 1.0 ml/min |
| temperature of thermostatic chamber | 40° C. |
| detector | differential refractometer |
| detected temperature | 40° C. |
| amount of sample injected | 200 µl |

A calibration curve was taken using the retention time (Rt) of commercial standard polystyrene as the X axis and the molecular weight of the polystyrene as the Y axis.

The retention time from when a peak rises until a peak falls was broken down into 0.2 minute intervals, and the peak height (Hi) of each retention time was read. The molecular weight (Mi) corresponding to each retention time was obtained from the calibration curve.

The Mw was determined using the formula below.

$$Mw = \Sigma HiMi/Hi$$

(2) Content of Cis-1,4-structure

This was determined by calculation according to the MORERO method using an infrared spectrophotometer.

Four test tires of size 185/70R13 using the rubber composition having the proportions shown in Table 1 were fitted to a passenger vehicle having a displacement amount of 1600 cc, and the tire perfoemances below were measured. The results thereof are also shown in Table 1.

(1) Ice Skid Performance

The ice skid performance was evaluated by using the braking performance on ice as an index. The braking performance on icy road surface was measured at temperatures of −1° C. and −8° C. The performance on ice is as an index using the following formula.

Performance on ice=(braking distance of control tire (subject example)/braking distance of test tire)×100. The Larger the value of index the better the ice skid performance.

(2) Wet Skid Performance

The wet skid performance was evaluated by using the braking performance in the wet condition as an index. The braking distance at 80 km/h was indexed under a load equivalent of two passengers in the vehicle. The performance in the wet condition is expressed as an index with the subject example set as 100. The wet skid performance was evaluated with a higher number of index showing a better performance.

(3) Dry Performance

The evaluation of the above pneumatic tire was performed on a proving ground. The test driver carried out an evaluation of dry performance by performing a comprehensive evaluation of traction performance, braking performance, handling responsiveness, and controllability when steering. The performance is expressed as an index with the evaluation value of the subject example set as 100. Accordingly, the higher the value, the better the dry performance.

(4) Abrasion Resistance

A portion of the rubber composition of the tread portion of the pneumatic tire was cut out and used as a test piece. Measurement of the abrasion resistance of this test piece was performed using a Lambourne abrasion tester (manufactured by Iwamoto Seisakujo Inc.) under conditions of a temperature of 30° C. and at a slip ratio of 20%. The results are expressed as an index with the subject example taken as 100. The higher the value of the index, the better the abrasion resistance.

TABLE 1

|  | Subject Example | Comparative Example 1 | Comparative Example 2 | Example 1 | Example 2 | Example 3 | Example 4 |
|---|---|---|---|---|---|---|---|
| NR | — | — | — | — | 20 | — | — |
| SBR 1500 | 100 | 55 | 55 | 55 | 50 | 50 | 50 |
| BR01 | 0 | 45 | 45 | — | — | 20 | 20 |
| Low molecular weight BR | — | — | — | 45 | 30 | 30 | 30 |
| Carbon black SAF | 60 | 60 | 10 | 10 | 10 | 10 | 40 |
| Silica VN3 | — | — | 70 | 70 | 70 | 70 | 40 |
| Silane coupling agent | — | — | 7 | 7 | 7 | 7 | 7 |
| Oil | 30 | 30 | 30 | 20 | 20 | 20 | 20 |
| Ice skid performance | 100 | 110 | 115 | 115 | 112 | 115 | 108 |
| Wet skid performance | 100 | 90 | 95 | 105 | 107 | 103 | 101 |
| Dry performance | 100 | 90 | 95 | 105 | 107 | 103 | 108 |
| Abrasion resistance | 100 | 120 | 110 | 105 | 105 | 108 | 113 |

From the results shown in Table 1 it can clearly be seen that, when the rubber compositions of the comparative examples 1 and 2, in which general use BR was blended, were used in the tire tread portion, the wet skid performance was unsatisfactory. In contrast, when the rubber compositions of the examples 1 to 4, in which low molecular weight BR was blended in a predetermined proportion, were used in the tire tread portion, the ice skid performance and the wet skid performance were both consistently superior, and the abrasion resistance was also excellent.

According to the present invention, there is provided a rubber composition and a pneumatic tire having excellent control and braking performance on snowy and/or icy road surface, namely, ice skid performance, and which is able to provide satisfactory wet skid performance by preventing any reduction in wet skid performance.

What is claimed is:

1. A rubber composition comprising
   100 parts by weight of rubber component and
   40 parts by weight to 95 parts by weight of silica,
   wherein said rubber component comprises:
   (1) 5 percent by weight to 50 percent by weight of low molecular weight butadiene rubber (BR) having a cis 1,4-structure of 60 mol % to 98 mol % and a weight average molecular weight (Mw) of 5000 to 80000; and
   (2) 50 percent by weight to 90 percent by weight of styrene-butadiene rubber (SBR) having a bound styrene content of 15 percent by weight to 45 percent by weight and amount of a vinyl bonding in the butadiene portion of 7 mol % to 60 mol %.

2. The rubber composition according to claim 1, wherein the rubber component includes 60 percent by weight to 80 percent by weight of the styrene-butadiene rubber (2).

3. The rubber composition according to claim 1, wherein the rubber component includes 0 percent by weight to 30 percent by weight of natural rubber.

4. The rubber composition according to claim 1, further comprising carbon black, wherein the total amount of the silica and the carbon black is 70 parts by weight to 99 parts by weight relative to 100 parts by weight of the rubber component.

5. The rubber composition according to claim 1, further comprising carbon black, wherein the proportion of the silica is 45 percent by weight to 99 percent by weight relative to the total blended amount of the silica and the carbon black.

6. The rubber composition according to claim 1, wherein the ratio of the dynamic modulus of elasticity of the rubber composition at −20° C. {E'(−20)} to the dynamic modulus of elasticity of the rubber composition at 30° C. {E'(30)} {E'(−20)/E'(30)} is less than 5.5.

7. The rubber composition according to claim 6, wherein the ratio {E'(−20)/E'(30)} is less 2.5 to 5.3.

8. The rubber composition according to claim 1, wherein the rubber composition is used in a tread portion of a pneumatic tire.

9. A pneumatic tire having a tread portion in which a rubber composition forming at least a road contacting portion of the tread portion comprising
   100 parts by weight of rubber component and
   40 parts by weight to 95 parts by weight of silica,
   wherein said rubber component comprises:
   (1) 5 percent by weight to 50 percent by weight of low molecular weight butadiene rubber (BR) having a cis 1,4-structure of 60 mol % to 98 mol % and a weight average molecular weight (Mw) of 5000 to 80000; and
   (2) 50 percent by weight to 90 percent by weight of styrene-butadiene rubber (SBR) having a bound styrene content of 15 percent by weight to 45 percent by weight and amount of a vinyl bonding in the butadiene portion of 7 mol % to 60 mol %.

10. The pneumatic tire according to claim 9, wherein the tread portion comprises a cap layer and a base layer and the cap layer is formed from the rubber composition.

11. The pneumatic tire according to claim 10, wherein at least one electrically conductive insert is radially extending through the cap layer to reach the base layer.

12. The pneumatic tire according to claim 11, wherein the volume specific resistance of the electrically conductive insert is $10^9$ Ωcm or less.

13. The pneumatic tire according to claim 11, wherein the volume specific resistance of the electrically conductive insert is $10^6$ Ωcm or less.

* * * * *